United States Patent
Whiteneck et al.

(10) Patent No.: US 10,756,988 B2
(45) Date of Patent: Aug. 25, 2020

(54) SYSTEM AND METHOD OF ISOLATING QOS FAULT

(71) Applicant: CHARTER COMMUNICATIONS OPERATING, LLC, St. Louis, MO (US)

(72) Inventors: Judson Whiteneck, Denver, CO (US); Dave Rodrian, Littleton, CO (US); Larry J. Burton, Greenwood Village, CO (US)

(73) Assignee: CHAPTER COMMUNICATION OPERATING LLC., St. Louis, MO (US)

( * ) Notice: Subject to any disclaimer, the term of this patent is extended or adjusted under 35 U.S.C. 154(b) by 487 days.

(21) Appl. No.: 15/004,475

(22) Filed: Jan. 22, 2016

(65) Prior Publication Data

US 2017/0214585 A1 Jul. 27, 2017

(51) Int. Cl.
*H04L 12/24* (2006.01)
*H04L 12/26* (2006.01)
*H04L 12/803* (2013.01)

(52) U.S. Cl.
CPC ...... *H04L 41/5038* (2013.01); *H04L 41/5035* (2013.01); *H04L 43/0894* (2013.01); *H04L 47/122* (2013.01)

(58) Field of Classification Search
CPC ............. H04L 41/5038; H04L 41/5035; H04L 43/0894; H04L 47/122
See application file for complete search history.

(56) References Cited

U.S. PATENT DOCUMENTS

| | | | |
|---|---|---|---|
| 9,037,699 B1* | 5/2015 | Bordner-Babayigit et al. | ............. H04L 25/0262 709/224 |
| 9,553,780 B1* | 1/2017 | Bullukian | ........... H04L 41/5025 |
| 2009/0113045 A1* | 4/2009 | Kozisek | .................. H04L 43/50 709/224 |
| 2012/0076015 A1* | 3/2012 | Pfeffer | ................ H04L 12/2801 370/252 |
| 2013/0103749 A1* | 4/2013 | Werth | .................... G06F 9/4446 709/203 |
| 2014/0086073 A1* | 3/2014 | Baykal | ................ H04L 41/5038 370/252 |
| 2014/0254390 A1* | 9/2014 | Ansley | .................. H04W 24/10 370/241 |
| 2015/0019713 A1* | 1/2015 | Bugenhagen | ....... H04L 43/0811 709/224 |
| 2015/0138994 A1* | 5/2015 | Dadheech | ........... H04L 41/5025 370/249 |
| 2016/0057028 A1* | 2/2016 | Smith | ..................... H04L 43/08 370/252 |
| 2017/0099205 A1* | 4/2017 | Gupta | ................. H04L 43/0888 |

* cited by examiner

*Primary Examiner* — Jeffrey M Rutkowski
*Assistant Examiner* — Chae S Lee
(74) *Attorney, Agent, or Firm* — Meagher Emanuel Laks Goldberg & Liao, LLP.

(57) ABSTRACT

Systems, methods, architectures, mechanisms or apparatus for automatically pinpointing specific service bottlenecks within a network services chain delivery network services to a subscriber by remotely and/or automatically invoking multiple quality of service (QoS) tests at customer premises equipment (CPE) such as a modem, wireless access point (WAP), subscriber device and the like.

19 Claims, 4 Drawing Sheets

SYSTEM AND METHOD OF ISOLATING QOS FAULT

FIELD OF THE DISCLOSURE

The present disclosure generally relates to communications networks and, more particularly but not exclusively, to Internet Service Provider (ISP) access networks providing network services to subscribers.

BACKGROUND

Internet Service Providers (ISPs) often receive troubleshooting calls pertaining to Internet access speed from subscribers. For example, having purchased service associated with a specific minimum upload and/or download access speed or bit rate, a subscriber may use a third-party tool to determine that the actual service quality is less than the purchased service quality. Applications as well as browser-based may be used for this purpose by the subscriber. For example, speedtest.net tests speed by monitoring download and upload data transfer between a subscriber device such as a laptop computer and a remote server.

Even if the test used by the subscriber accurately determines the data transfer rate or speed experienced by the subscriber device, the cause of a less than satisfactory determination may have little or nothing to do with the ISP. Problems impacting speed may include old, poorly configured or malfunctioning equipment, hardware and/or software at the subscriber location. Typical examples include old/incompatible Wireless Access Points (WAPs) or other Wi-Fi equipment, improperly configured or malfunctioning client device hardware or software, and so on. Unfortunately, valuable service personnel time is expended by the ISP helping a subscriber identify the cause of the problem.

SUMMARY

Various deficiencies in the prior art are addressed by systems, methods, architectures, mechanisms or apparatus for automatically pinpointing specific service bottlenecks within a network services chain delivery network services to a subscriber.

A method according to one embodiment comprises a mechanism wherein multiple speed tests or other diagnostic programs are used to automatically pinpoint specific bottlenecks within the network services delivery chain associated with a particular subscriber. In one embodiment, a first speed test measures data transfer rates between a timing server and a subscriber device, while a second speed test measures data transfer rates between a timing server and a modem providing Internet access to the subscriber device. By comparing differences between the first and second speed test measurements a determination may be made as to whether an intervening device such as a router, Wireless Access Point (WAP), network bridge or other customer premises device is a cause of poor performance experienced by the subscriber. In various embodiments, the subscriber device used for the first speed test comprises other customer premises devices such as a router, WAP, network bridge and the like.

In one embodiment, a multiple speed test diagnostic function is invoked by a subscriber via a subscriber device. In another embodiment, the multiple speed test diagnostic function is invoked by ISP service personnel.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
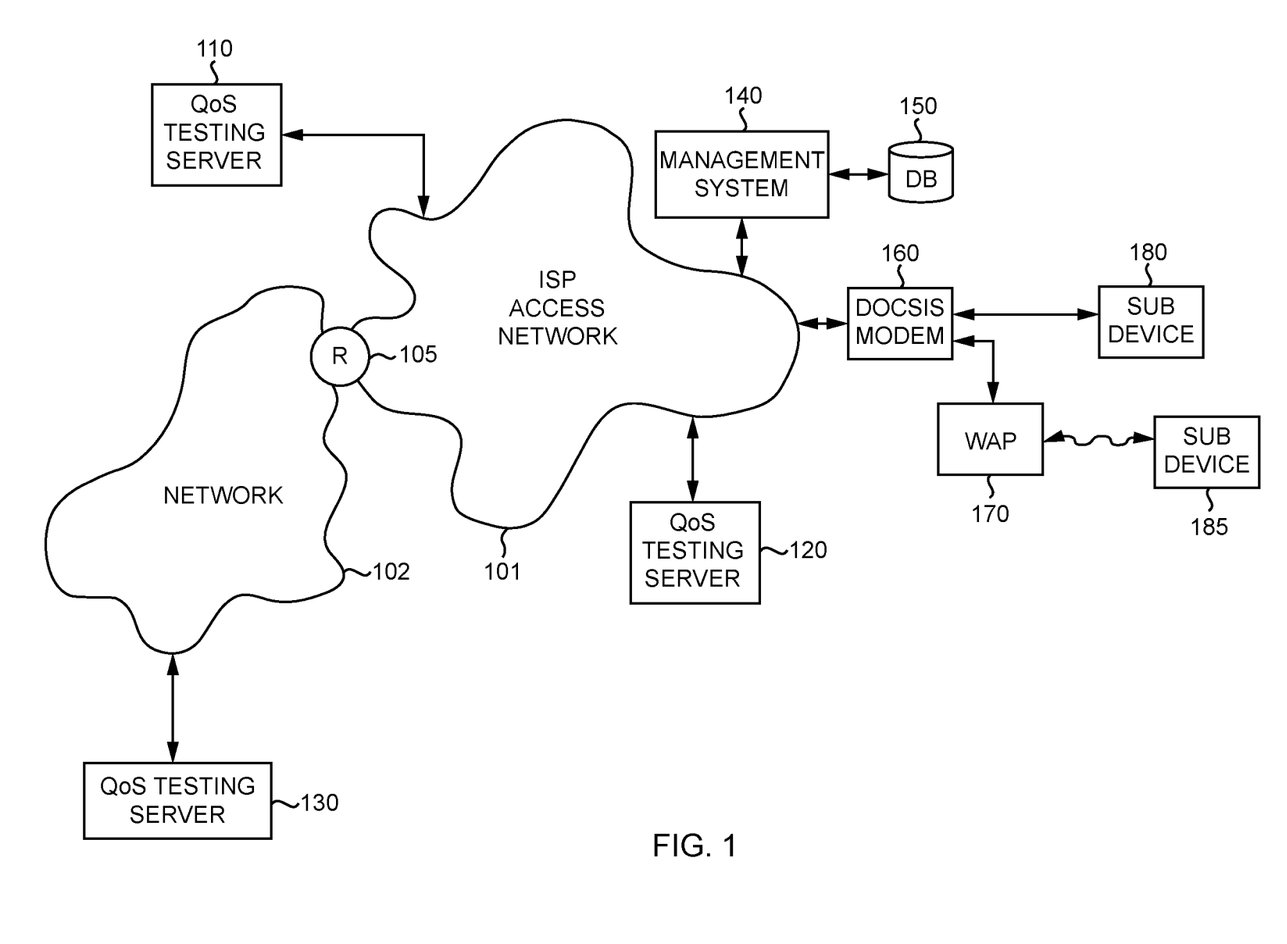
FIG. 1 depicts a high-level block diagram of a system benefiting from various embodiments.

FIG. 1 depicts a high-level block diagram of a system benefiting from various embodiments.

Specifically, FIG. 1 depicts a system 100 comprising a first or Internet Service Provider (ISP) access network 101 operably coupled to a second network 102 (such as a core network or more generally the Internet) via a router 105. Each of the networks 101/102 comprises a plurality of routing devices, switching devices and so on as is known in the art.

The access network 101 is managed by a network services provider such as a cable television company, multi-system operator (MSO), telecommunications network provider, wireless network provider and so on. For purposes of simplicity it will be assumed that the ISP access network 101 is managed by a cable television company to provide data/Internet services, television services, telephony services and so on.

The management system 140 cooperating with a database 150 is depicted herein as providing various management functions associated with the access network 101, including particular functions according to the embodiments as will be described herein.

A first quality of service (QoS) testing server 110 and second QoS testing server 120 communicate directly with the ISP access network 101, while a third QoS testing server 130 communicates directly with the second network 102 and the directly with ISP access network 101 via edge router 105. More or fewer QoS testing servers may be communicatively coupled to either of the first 101 or second 102 networks, be used as will be appreciated by those skilled in the art.

FIG. 1 depicts subscriber equipment comprising a modem 160 (e.g., a DOCSIS modem) in communication with the ISP access network 101 to receive network services therefrom. The modem 160 is depicted as being coupled to a subscriber device 180, such as a desktop computer, laptop computer or other wire line (e.g., Ethernet) computing device. The modem 160 is also depicted as being coupled to a wireless access point (WAP) 170 such as a Wi-Fi router (e.g., 802.X, WiMAX and the like) which in turn may communicate with any of a plurality of subscriber devices such as laptop computers, tablet computers, smart phones and various other wireless enabled mobile devices.

Optionally, a handheld technician device 190 may be used to access ISP services via the modem 160, WAP 170 or other available customer premises equipment (CPE). The handheld technician device 190 is typically used by service personnel visiting a subscriber location such as a home or business to set up CPE, troubleshoot various problems with CPE such as poor connectivity or performance, and generally access provider equipment (PE) resources from a subscriber's location.

Various subscriber devices 180, 185 as well as the handheld technician device 190 is capable of accessing the network 101 via a web browser such as Internet Explorer, Edge, Chrome, Firefox, Safari, and the like. Each of the subscriber devices 180, 185 as well as the handheld technician device 190 is capable of invoking a QoS test via browser interaction or a standalone application to measure one or more QoS parameters associated with the network services provided via the ISP. In various embodiments, subscriber devices may be configured in hardware or a combination of hardware and software to perform the relevant functions described herein as being performed via a web browser. For example, CPE such as a cable modem, wireless access point (WAP), router, bridge and the like may include hardware or a combination of hardware and software that configures the CPE to perform QoS related testing and/or other functions described below with respect to browser-enabled subscriber devices.

Generally speaking, the main QoS parameter of interest throughput; namely, the bandwidth or bits per second for data received by the subscriber device from a server (i.e., downstream throughput) and/or the bandwidth or bits per second for data transmitted by the subscriber device to a server (i.e., upstream throughput). Other QoS parameters of interest may comprise jitter, latency, reachability and so on.

Throughput testing may be performed by measuring the time required to transfer a file of known size from the QoS testing server to the subscriber device (downstream throughput) and/or measuring the time required to transfer a file known size from the subscriber device to the QoS testing server (upstream throughput). Other techniques are also known. For example, some test applications will dynamically configure the file size to accommodate variation of provisioned speeds among users (i.e., if the customer has a low bit rate, the files transmitted from or to the customer are reduced in size to that the file transmission may be complete in a reasonable time and with sufficient accuracy).

Each of the first 110 and second 120 QoS testing servers comprises an ISP server configured to perform QoS testing and management functions associated with at least the modem 160, such as throughput and/or other QoS measurements associated with a communications channel established between a QoS testing server 110, 120 and a modem 160. In various embodiments the modem 160 is configured to enable QoS testing and management functions wherein the modem 160 operates as an endpoint.

In various embodiments, the first 110 and second 120 QoS testing servers are further configured to perform QoS testing and management functions associated with a communications channel established between a QoS testing server 110, 120 and a subscriber device 180, 185.

The third 130 QoS testing server may comprise an ISP or third party (i.e., not provided by the ISP) server operative to provide throughput measurements associated with a communications channel established between the QoS testing server 130 and a subscriber device 180, 185. Third-party QoS testing servers and throughput testing provided thereby may be invoked by client, technician or other endpoint devices via several different websites, illustratively those provided by Ookla, Inc., such as www.speedtest.net.

Figure 2:
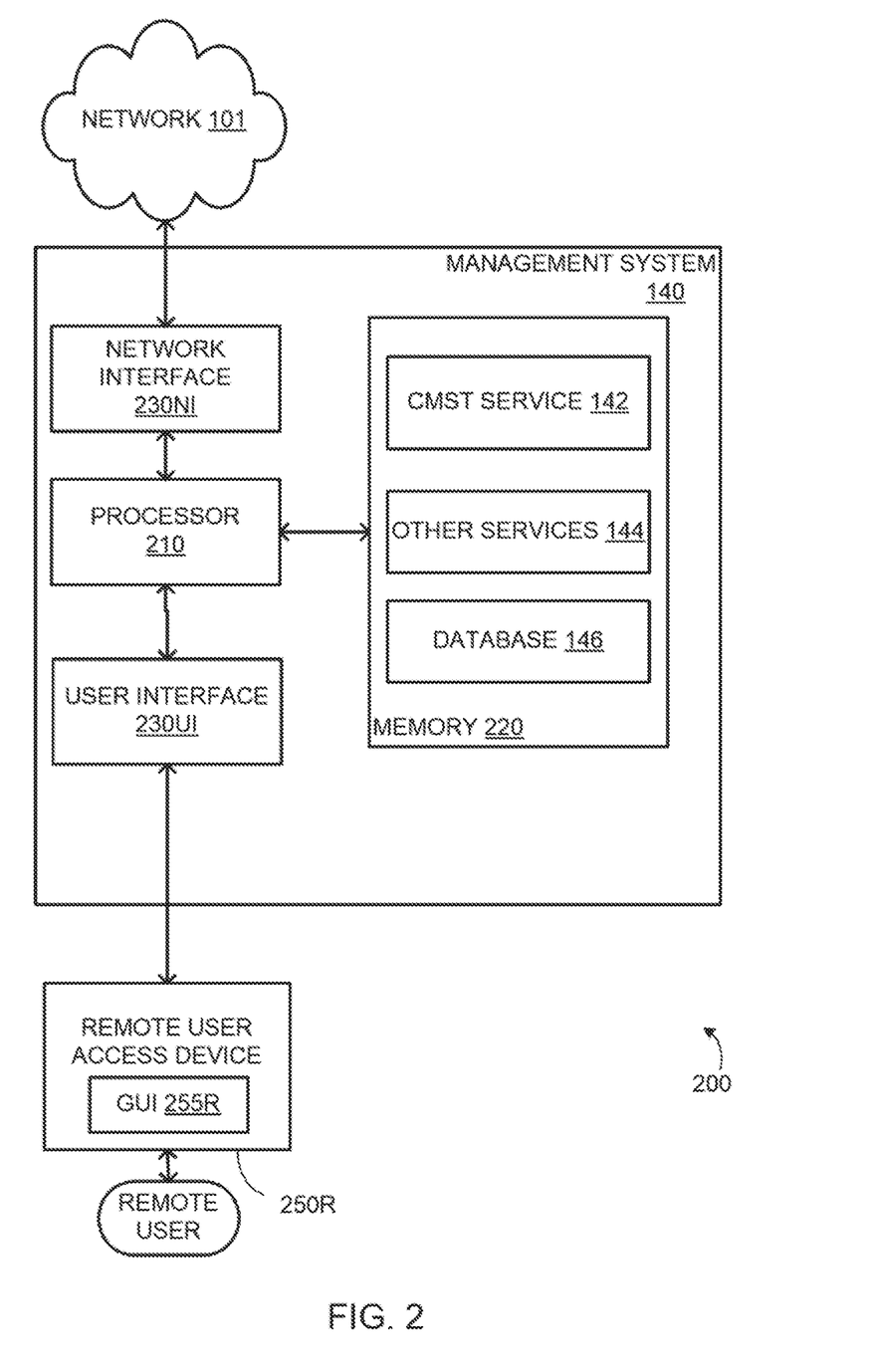
FIG. 2 depicts an exemplary management system (MS) suitable for providing various QoS testing and management functions as described herein.

FIG. 2 depicts an exemplary management system (MS) suitable for providing various QoS testing and management functions as described herein.

As depicted in FIG. 2, MS 140 includes one or more processor(s) 210, a memory 220, a network interface 230N, and an optional user interface 230I. The processor(s) 210 is coupled to each of the memory 220, the network interface 230N, and the user interface 230I.

The processor(s) 210 is adapted to cooperate with the memory 220, the network interface 230N, the user interface 230I, and various support circuits to provide various QoS testing and management functions described herein.

The memory 220, generally speaking, stores programs, data, tools and the like that are adapted for use in providing various functions as described herein with respect to the figures.

The memory 220 includes a CPE Speed Test (CPE-ST) service module 142, various other service modules 144 and a database 146 (alternatively, an external database 150 may be utilized).

The network interface 230N is adapted to facilitate communications with various network elements, nodes and other entities within the system 100 to support the DCAS management functions described herein.

The user interface 230I is adapted to facilitate communications with one or more remote user workstations for enabling one or more users to perform ISP and other management functions for the system 100. For example, various embodiments, QoS management testing functions, subscriber provisioning functions, subscriber solicitation functions, field technician support functions and the like may be provided thereby.

Figure 3:
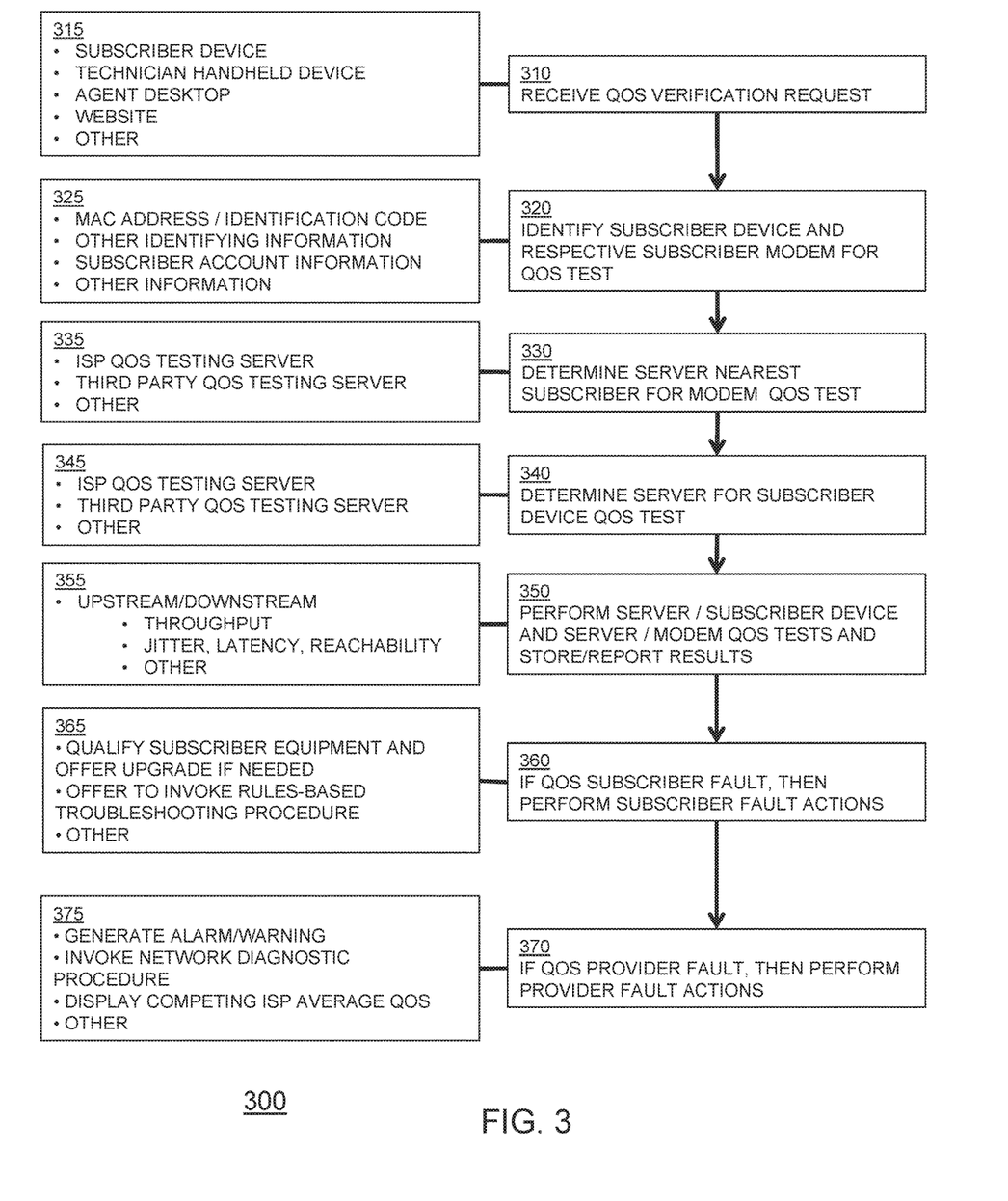
FIG. 3 depicts a flow diagram of a QoS test and measurement method according to various embodiments.

FIG. 3 depicts a flow diagram of a QoS test and measurement method according to various embodiments. The method 300 of FIG. 3 may be invoked in whole or in part at the management system 140, such as via the CMST service module 142 and related functional elements.

At 310, a QoS verification request is received at, illustratively, an entity of a management system such as a server, controller, router or other management entity. Referring to 315, such request may be provided via a technician handheld device, a management agent or user desktop, a website or by some other means. Generally speaking, the QoS verification request comprises a request to verify throughput or some other QoS parameter associated with a particular subscriber device. The subscriber device may comprise a cable modem, a router, a set top box or any other subscriber device.

At 320, the subscriber device associated with the QoS verification request is identified along with the modem used to provide access network connectivity to the subscriber device. Referring to 325, such identification may be provided via a media access control address (MAC address), built-in identification code and/or other identifying information associated with the subscriber device and modem. Further, subscriber account information and other information is accessed and associated with the subscriber device and/or modem.

At 330, the QoS testing server nearest the subscriber device is determined for use in performing the modem QoS test. That is, the QoS testing server nearest the subscriber device associated with the QoS verification request and suitable for use in performing a QoS test with the modem 160 as an endpoint is determined. Referring to 335, such determination may be made with respect to an ISP QoS testing server 110, 120, third-party QoS testing server 130 or some other ISP or third-party QoS testing server.

At 340, the QoS testing server nearest the subscriber device is determined for use in performing the subscriber device QoS test. That is, the QoS testing server nearest the subscriber device associated with the QoS verification request and suitable for use in performing a QoS test with the subscriber device 180, 185 as an endpoint is determined. Referring to 335, such determination may be made with respect to an ISP QoS testing server 110, 120, third-party QoS testing server 130 or some other ISP or third-party QoS testing server.

At 350, multiple QoS tests are performed and the results are stored and/or reported. Specifically, a first test is performed to measure subscriber device QoS (e.g., throughput experienced by the subscriber device as an endpoint) and a second test is performed to measure modem QoS (e.g., throughput experienced by the modem as an endpoint). Referring to 355, the QoS tests may comprise upstream and/or downstream measurements of throughput, jitter, latency, reachability or some other QoS parameter.

A subscriber fault condition is a condition indicative of a problem with CPE, such as with a wireless access point, router or some other subscriber equipment.

Fault Conditions

If all equipment including subscriber equipment is working properly, the results of the first test measuring subscriber device QoS should be similar to the results of the second test measuring modem QoS.

A subscriber fault condition exists where a difference between subscriber device QoS and modem QoS exceeds a threshold level. For example, if the measured modem throughput exceeds the measured subscriber device throughput by a threshold level then a subscriber fault condition is said to exist. The threshold level may be determined with respect to a percentage difference of throughput or other QoS parameter (e.g., 5%, 10%, 20% of expected throughput, jitter rate, latency and the like), a nominal difference of throughput or other QoS parameter (e.g., 1 Mb per second, 5 Mb per second, 10 Mb per second and the like) or some other determined threshold level.

A provider fault condition exists where the difference between subscriber device QoS and modem QoS does not exceed a threshold level, but also does not satisfy a Service Level Agreement (SLA) or other QoS requirement.

At 360, if a subscriber fault condition is identified, then subscriber fault actions are performed. Referring to 365, subscriber fault actions may comprise qualified subscriber equipment to determine if it is adequate and/or up to date and offering an upgrade if needed, offering to invoke a rules-based troubleshooting procedure at the subscriber device so that the subscriber may self-diagnose problems with his or her equipment and/or performing other functions.

At 370, if a provider fault condition is identified, then provider fault actions are performed. Referring to 375, provider fault actions may comprise generating alarms or warnings for use by one or more network management entities, invoking network diagnostic procedures to determine which element(s) within the ISP access network 101 (or other networks 102) are causing the provider fault, displaying average QoS measurements associated with competing ISPs available to the subscriber and/or performing other procedures.

As previously noted, a subscriber device performing the functions described herein may comprise browser-enabled CPE such as smart phones, computers and the like, as well as other CPE such as cable modems, wireless access points (WAPs), routers, bridges and the like configured via hardware or a combination of hardware and software to perform the relevant functions described herein.

Various embodiments described herein contemplate an integration of CPE testing with a browser client test to derive additional information suitable for characterizing link speed or other QoS associated with the CPE. In this manner, multiple QoS related tests such as speed, jitter, latency and the like may be performed to more quickly isolate fault conditions within the network itself or within CPE. Specific CPE may be selected for testing. Alternately, some or all of the CPE may be selected for testing such that a sequence of tests in initiated. The QoS tests may be initiated by the system itself, the subscriber, a technician and so on. Initiation of the tests may be via interaction with a management entity or by selection of a locally presented test function (e.g., a user selectable item presented via a web portal, a graphical user interface (GUI) generated by a set top box or other CPE.

As noted above, if all equipment including subscriber equipment is working properly, the results of the first test measuring subscriber device QoS should be similar to the results of the second test measuring modem QoS. In this manner, a determination may be made as to whether a source of a QoS problem is related to PE or to CPE.

In various embodiments, the steps of method 300 or repeated for each of some or all of the CPE associated with a subscriber, such as a wired or wireless set top box (STB), a wireless access point (WAP), a routing device, a computer or smartphone, and/or some other CPE.

In one such embodiment, the first test is performed for each CPE and the second test is performed for the modem. The results of each first test measuring QoS of a particular CPE should be similar to the results of each second test measuring modem QoS. Thus, where dissimilar results are obtained at a particular CPE it may be deduced that the particular CPE (or link thereto, or adjacent CPE) is a source of a QoS problem.

In another such embodiment, the first, second, third (and so on) tests may be performed for each different CPE (i.e., not necessarily the modem), such as physically or logically adjacent CPE. Examples of this may include modem/STB, modem/WAP, WAP/wireless STB, WAP/computer, WAP/ smartphone, modem/WAP/computer, modem/WAP/smartphone and the like. The results of each of these two or more QoS tests should yield similar results. Thus, where dissimilar results are obtained at a particular CPE it may be deduced that the particular CPE (or link thereto, or adjacent CPE) is a source of a QoS problem.

Thus, in various embodiments, one or more QoS tests in addition to or in place of the modem QoS test are provided. In response to a difference in QoS delivered to a subscriber device and QoS delivered to CPE disposed between the subscriber device and other CPE (such as a modem) exceeding a threshold amount, a message is generating indicative of a subscriber network problem associated with the CPE and, optionally, the particular CPE related to the subscriber network problem.

Figure 4:
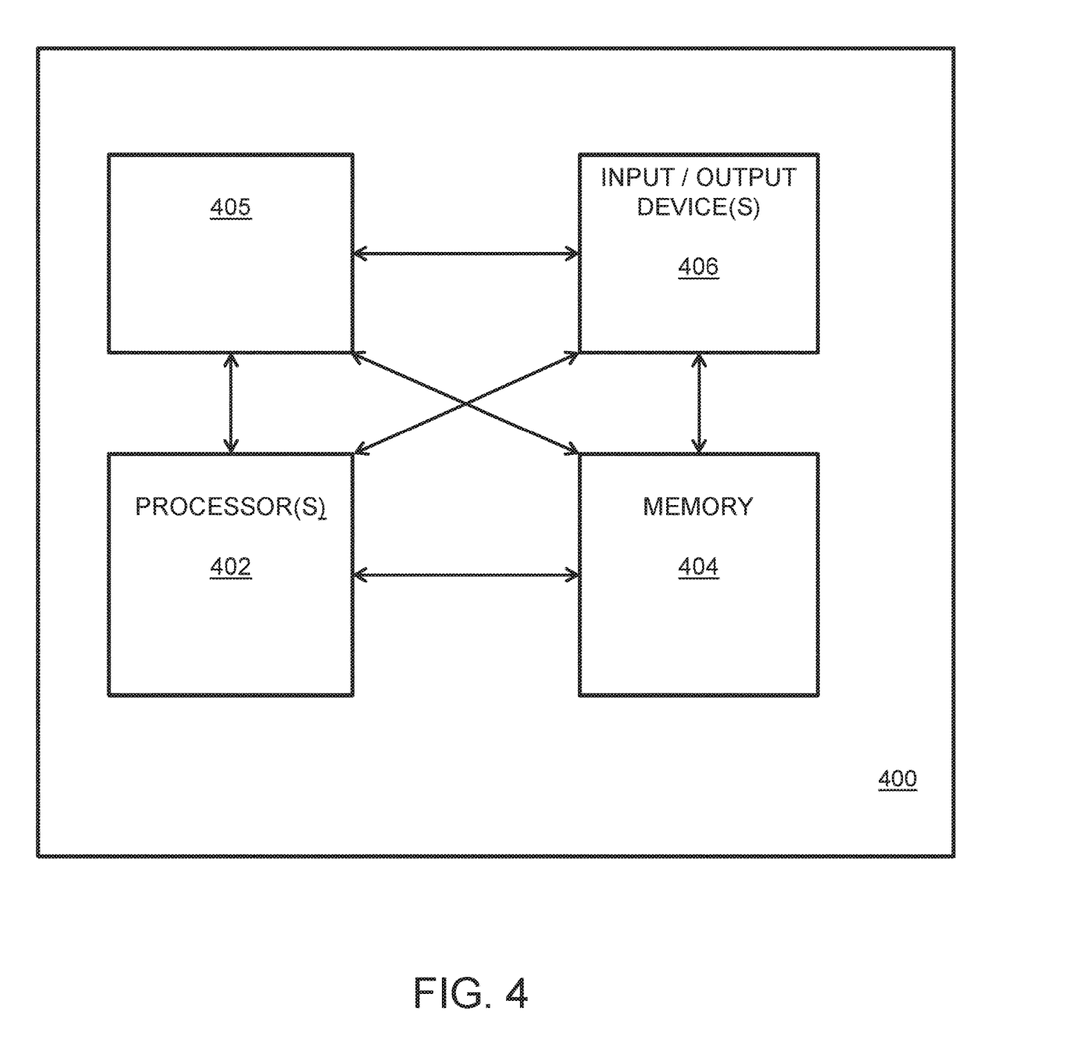
FIG. 4 depicts a high-level block diagram of a computing device suitable for use in performing the functions described herein.

FIG. 4 depicts a high-level block diagram of a computing device, such as a processor in a communications network element, suitable for use in performing functions described herein such as those associated with the various elements described herein with respect to the figures.

In particular, any of the various functional entities described herein, such as network routing entities, network management entities, server devices, client/subscriber devices and so on within the communication network may be implemented in accordance with a general computing device structure such as described herein with respect to the various figures.

As depicted in FIG. 4, computing device 400 includes a processor element 403 (e.g., a central processing unit (CPU) or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:
1. A method of verifying quality of service (QoS) of network services delivered to a subscriber via a network services delivery chain including provider equipment (PE) and customer premises equipment (CPE), comprising:
   receiving, at a PE network management system, a QoS verification request associated with a subscriber device and a modem via which the subscriber device accesses network services;
   performing, at a QoS testing server configured to communicate with the subscriber device via an access network communications channel established therebetween, a first test to determine a QoS delivered to the subscriber device, said first test comprising transferring data between said subscriber device and a first QoS testing server to determine thereby corresponding upstream and downstream bandwidth measurements;
   performing, at a QoS testing server configured to communicate with the modem via an access network communications channel established therebetween, a second test to determine a QoS delivered to the modem, said second test comprising transferring data between said modem and a second QoS testing server to determine thereby corresponding upstream and downstream bandwidth measurements;
   in response to the QoS delivered to the modem exceeding the QoS delivered to the subscriber device by a threshold amount, performing a subscriber fault action comprising transmitting toward said subscriber a message indicative of a subscriber network problem and offering a qualified device to said subscriber in response to determining, at the PE network management system, that one or more devices associated with said subscriber are associated with a non-qualified device; and
   in response to the QoS delivered to the modem not satisfying a required QoS level, performing a provider fault action.
2. The method of claim 1, wherein said QoS comprises at least one of a measure of bandwidth, a measure of latency, a measure of jitter and a measure of reachability.

3. The method of claim 1, further comprising:
transmitting toward said subscriber device a message indicative of a subscriber network problem and offering to invoke a rules-based troubleshooting procedure.

4. The method of claim 1, wherein said QoS verification request is received from a mobile technician device, said method further comprising:
transmitting toward said mobile technician device a message indicative of a subscriber network problem.

5. The method of claim 1, wherein said QoS verification request is received from a service agent device, said method further comprising:
transmitting toward said service agent device a message indicative of a subscriber network problem.

6. The method of claim 1, wherein said first and second QoS testing servers comprise a provider network QoS testing server.

7. The method of claim 1, wherein said QoS testing server configured to communicate with the subscriber device comprises a third party QoS testing server and said second QoS testing server configured to communicate with the modem comprises a provider network QoS testing server proximate said modem being tested.

8. A method of verifying quality of service (QoS) of network services delivered to a subscriber via a network services delivery chain including provider equipment (PE) and customer premises equipment (CPE), comprising:
receiving, at a PE network management system, a QoS verification request associated with a subscriber device and a modem via which the subscriber device accesses network services;
performing, at a QoS testing server configured to communicate with the subscriber device via an access network communications channel established therebetween, a first test to determine a QoS delivered to the subscriber device, said first test comprising transferring data between said subscriber device and a first QoS testing server to determine thereby corresponding upstream and downstream bandwidth measurements;
performing, at a QoS testing server configured to communicate with the modem via an access network communications channel established therebetween, a second test to determine a QoS delivered to the modem, said second test comprising transferring data between said modem and a second QoS testing server to determine thereby corresponding upstream and downstream bandwidth measurements;
in response to the QoS delivered to the modem exceeding the QoS delivered to the subscriber device by a threshold amount, performing a subscriber fault action;
in response to the QoS delivered to the modem not satisfying a required QoS level, performing a provider fault action;
storing results of said first and second test in a database within a non-transitory computer readable medium associated with the PE network management system;
receiving, at the PE network management system, a QoS history request associated with a subscriber device and the modem via which the subscriber device accesses network services;
retrieving, from said database, corresponding stored prior first and second test results; and
transmitting, toward a source of said QoS history request, said retrieved prior first and second test results.

9. The method of claim 8, further comprising:
in the case of said source of said QoS history request comprising a subscriber device, transmitting toward said subscriber device a message providing average QoS data of at least one competing network services provider able to provide service at the location of said subscriber device.

10. The method of claim 1, wherein said subscriber device comprises a browser enabled device configured to derive thereby additional information suitable for characterizing QoS parameters associated with the CPE.

11. The method of claim 1, further comprising:
performing, at a QoS testing server configured to communicate with the modem via an access network communications channel established therebetween, a third test to determine a QoS delivered to CPE supporting communications between the subscriber device and the modem; and
in response to the QoS delivered to the CPE exceeding the QoS delivered to the subscriber device by a threshold amount, performing a subscriber fault action associated with the CPE.

12. The method of claim 11, wherein said CPE comprises one or more of a set top box (STB), a wireless access point (WAP) and a routing device.

13. The method of claim 1, wherein:
said subscriber fault action comprises at least one of offering to upgrade said subscriber device and offering to invoke a rules-based troubleshooting procedure at the subscriber device; and
said provider fault action comprises at least one of generating an alarm, generating a warning and invoking a network diagnostics procedure to identify one or more PE network elements causing the provider fault.

14. An apparatus for verifying quality of service (QoS) of network services delivered to a subscriber via a network services delivery chain including provider equipment (PE) and customer premises equipment (CPE), the apparatus comprising:
a processor configured for:
receiving a QoS verification request associated with a subscriber device and a modem via which the subscriber device accesses network services;
performing, at a first QoS testing server configured to communicate with the subscriber device via an access network communications channel established therebetween, a first test to determine a QoS delivered to the subscriber device, said first test comprising transferring data between said subscriber device and said first QoS testing server to determine thereby corresponding upstream and downstream bandwidth measurements;
performing, at a second QoS testing server configured to communicate with the modem via an access network communications channel established therebetween, a second test to determine a QoS delivered to the modem said second test comprising transferring data between said modem and said second QoS testing server to determine thereby corresponding upstream and downstream bandwidth measurements;
in response to the QoS delivered to the modem exceeding the QoS delivered to the subscriber device by a threshold amount, performing a subscriber fault action comprising transmitting toward said subscriber a message indicative of a subscriber network problem and offering a qualified device to said subscriber in response to determining, at the PE network management system, that one or more devices associated with said subscriber are associated with a non-qualified device; and in response to the QoS delivered to the modem not satisfying a required QoS level, performing a provider fault action.

15. A tangible and non-transient computer readable storage medium storing instructions which, when executed by a computer, adapt the operation of the computer to perform a method of verifying quality of service (QoS) of network services delivered to a subscriber via a network services delivery chain including provider equipment (PE) and customer premises equipment (CPE), the method comprising:
receiving a QoS verification request associated with a subscriber device and a modem via which the subscriber device accesses network services;
performing, at a first QoS testing server configured to communicate with the subscriber device via an access network communications channel established therebetween, a first test to determine a QoS delivered to the subscriber device, said first test comprising transferring data between said subscriber device and said first QoS testing server to determine thereby corresponding upstream and downstream bandwidth measurements;
performing, at a second QoS testing server configured to communicate with the modem via an access network communications channel established therebetween, a second test to determine a QoS delivered to the modem said second test comprising transferring data between said modem and said second QoS testing server to determine thereby corresponding upstream and downstream bandwidth measurements;
in response to the QoS delivered to the modem exceeding the QoS delivered to the subscriber device by a threshold amount, performing a subscriber fault action comprising transmitting toward said subscriber a message indicative of a subscriber network problem and offering a qualified device to said subscriber in response to determining, at the PE network management system, that one or more devices associated with said subscriber are associated with a non-qualified device; and
in response to the QoS delivered to the modem not satisfying a required QoS level, performing a provider fault action.

16. A computer program product comprising a non-transitory computer readable medium storing instructions for causing a processor to implement a method of verifying quality of service (QoS) of network services, the method comprising:
receiving a QoS verification request associated with a subscriber device and a modem via which the subscriber device accesses network services;
performing, at a first QoS testing server configured to communicate with the subscriber device via an access network communications channel established therebetween, a first test to determine a QoS delivered to the subscriber device, said first test comprising transferring data between said subscriber device and said first QoS testing server to determine thereby corresponding upstream and downstream bandwidth measurements;
performing, at a second QoS testing server configured to communicate with the modem via an access network communications channel established therebetween, a second test to determine a QoS delivered to the modem said second test comprising transferring data between said modem and said second QoS testing server to determine thereby corresponding upstream and downstream bandwidth measurements;
in response to the QoS delivered to the modem exceeding the QoS delivered to the subscriber device by a threshold amount, performing a subscriber fault action comprising transmitting toward said subscriber a message indicative of a subscriber network problem and offering a qualified device to said subscriber in response to determining, at the PE network management system, that one or more devices associated with said subscriber are associated with a non-qualified device; and
in response to the QoS delivered to the modem not satisfying a required QoS level, performing a provider fault action.

17. The method of claim 8, wherein said subscriber fault action comprises transmitting toward said subscriber a message indicative of a subscriber network problem and offering a qualified device to said subscriber in response to determining, at the PE network management system, that one or more devices associated with said subscriber are associated with a non-qualified device.

18. The method of claim 8, wherein said subscriber fault action comprises comprising transmitting toward said subscriber device a message indicative of a subscriber network problem and offering to invoke a rules-based troubleshooting procedure.

19. The method of claim 8, wherein said QoS verification request is received from one of a mobile technician device and a service agent device, said method further comprising transmitting toward said one of a mobile technician device and a service agent device a message indicative of a subscriber network problem.

* * * * *